(12) United States Patent
Lee et al.

(10) Patent No.: US 8,146,641 B2
(45) Date of Patent: Apr. 3, 2012

(54) SEALANT HARDENING APPARATUS OF LIQUID CRYSTAL DISPLAY PANEL AND SEALANT HARDENING METHOD THEREOF

(75) Inventors: Sang Seok Lee, Taegu-kwangyokshi (KR); Myoung Gu Kang, Kumi-shi (KR); Jong Han Kim, Taegu-kwangyokshi (KR); Heung Sun Kim, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 1139 days.

(21) Appl. No.: 10/998,563

(22) Filed: Nov. 30, 2004

(65) Prior Publication Data

US 2005/0115499 A1    Jun. 2, 2005

(30) Foreign Application Priority Data

Dec. 1, 2003 (KR) .......................... 10-2003-0086435
Dec. 26, 2003 (KR) .......................... 10-2003-0097616

(51) Int. Cl.
   *B29C 65/00* (2006.01)
(52) U.S. Cl. ..................................... 156/379.6
(58) Field of Classification Search ............... 156/379.6, 156/272.2, 275.1, 275.5, 272.8; 118/642; 349/190
   See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,190,347 A * | 2/1980 | Siegmund | 355/1 |
| 4,653,864 A | 3/1987 | Baron | |
| 4,691,995 A | 9/1987 | Yamazaki | |
| 4,775,225 A | 10/1988 | Tsuboyama | |
| 5,217,290 A * | 6/1993 | Windross | 362/554 |
| 5,247,377 A | 9/1993 | Omeis | |

(Continued)

FOREIGN PATENT DOCUMENTS

CN    1437050 A    8/2003

(Continued)

OTHER PUBLICATIONS

JP10-293315A Translated Abstract.*

(Continued)

*Primary Examiner* — Daniel McNally
(74) *Attorney, Agent, or Firm* — McKenna Long & Aldridge, LLP.

(57) ABSTRACT

A sealant hardening apparatus of an LCD panel and a sealant hardening method is disclosed, being suitable for decreasing a tact time, and for being easily applied to LCD panels of the different models, by irradiating UV rays in a scanning method, or by directly irradiating UV rays to a sealant pattern without using a mask, which includes a stage on which substrates bonded by a sealant are loaded, for being moved in an in-line method; a mask provided above the bonded substrates, having an open part corresponding to a sealant portion to transmit the light, and a closed part corresponding to the remaining portions to prevent the light; at least two align cameras for aligning the mask and the bonded substrates; a lamp for irradiating UV rays of high energy; a plurality of optical fibers for transmitting UV rays of the lamp; and a UV irradiation part for irradiating the UV rays from the optical fibers to the bonded substrates through the mask by arranging and supporting the optical fibers at one line.

2 Claims, 6 Drawing Sheets

U.S. PATENT DOCUMENTS

| | | | |
|---|---|---|---|
| 5,263,888 A | 11/1993 | Ishihara | |
| 5,379,139 A | 1/1995 | Sato | |
| 5,406,989 A | 4/1995 | Abe | |
| 5,499,128 A | 3/1996 | Hasegawa | |
| 5,507,323 A | 4/1996 | Abe | |
| 5,511,591 A | 4/1996 | Abe | |
| 5,539,545 A | 7/1996 | Shimizu | |
| 5,548,429 A | 8/1996 | Tsujita | |
| 5,642,214 A | 6/1997 | Ishii | |
| 5,680,189 A | 10/1997 | Shimizu | |
| 5,742,370 A | 4/1998 | Kim | |
| 5,757,451 A | 5/1998 | Miyazaki | |
| 5,852,484 A | 12/1998 | Inoue | |
| 5,854,664 A | 12/1998 | Inoue | |
| 5,861,932 A | 1/1999 | Inata | |
| 5,875,922 A | 3/1999 | Chastine | |
| 5,952,676 A | 9/1999 | Sato | |
| 5,956,112 A | 9/1999 | Fujimori | |
| 6,001,203 A | 12/1999 | Yamada | |
| 6,004,413 A * | 12/1999 | Couttenier | 156/99 |
| 6,011,609 A | 1/2000 | Kato | |
| 6,016,178 A | 1/2000 | Kataoka | |
| 6,016,181 A | 1/2000 | Shimada | |
| 6,055,035 A | 4/2000 | Von Gutfeld | |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 | 10/2001 | Egami | |
| 6,337,730 B1 | 1/2002 | Ozaki | |
| 6,414,733 B1 | 7/2002 | Ishikawa | |
| 6,628,365 B1 * | 9/2003 | Park et al. | 349/153 |
| 6,689,218 B2 * | 2/2004 | Potyralio et al. | 118/641 |
| 2003/0173033 A1* | 9/2003 | Lee et al. | 156/382 |
| 2004/0000368 A1* | 1/2004 | Kasuga et al. | 156/64 |
| 2004/0129382 A1* | 7/2004 | Terashi et al. | 156/275.5 |

FOREIGN PATENT DOCUMENTS

| | | |
|---|---|---|
| EP | 1 003 066 A1 | 5/2000 |
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10293315 A * | 11/1998 |
| JP | 10-333157 | 12/1998 |
| JP | 10-333159 | 12/1998 |
| JP | 10-333160 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |

| | | | | | | |
|---|---|---|---|---|---|---|
| JP | 2001-133799 | 5/2001 | | JP | 2002-156518 | 5/2002 |
| JP | 2001-142074 | 5/2001 | | JP | 2002-169166 | 6/2002 |
| JP | 2001-147437 | 5/2001 | | JP | 2002-169167 | 6/2002 |
| JP | 2001-154211 | 6/2001 | | JP | 2002-182222 | 6/2002 |
| JP | 2001-166272 | 6/2001 | | JP | 2002-202512 | 7/2002 |
| JP | 2001-166310 | 6/2001 | | JP | 2002-202514 | 7/2002 |
| JP | 2001-183683 | 7/2001 | | JP | 2002-214626 | 7/2002 |
| JP | 2001-201750 | 7/2001 | | JP | 2002-229042 | 8/2002 |
| JP | 2001-209052 | 8/2001 | | JP | 2002-236276 | 8/2002 |
| JP | 2001-209056 | 8/2001 | | JP | 2002-258299 | 8/2002 |
| JP | 2001-209057 | 8/2001 | | JP | 2002-236292 | 9/2002 |
| JP | 2001-209058 | 8/2001 | | JP | 2002-277865 | 9/2002 |
| JP | 2001-209060 | 8/2001 | | JP | 2002-277866 | 9/2002 |
| JP | 2001-215459 | 8/2001 | | JP | 2002-277881 | 9/2002 |
| JP | 2001-222017 | 8/2001 | | JP | 2002-287156 | 10/2002 |
| JP | 2001-235758 | 8/2001 | | JP | 2002-296605 | 10/2002 |
| JP | 2001-255542 | 9/2001 | | JP | 2002-311438 | 10/2002 |
| JP | 2001-264782 | 9/2001 | | JP | 2002-311440 | 10/2002 |
| JP | 2001-272640 | 10/2001 | | JP | 2002-311442 | 10/2002 |
| JP | 2001-281675 | 10/2001 | | JP | 2002-323687 | 11/2002 |
| JP | 2001-281678 | 10/2001 | | JP | 2002-323694 | 11/2002 |
| JP | 2001-282126 | 10/2001 | | JP | 2002-333628 | 11/2002 |
| JP | 2001-305563 | 10/2001 | | JP | 2002-333635 | 11/2002 |
| JP | 2001-330837 | 11/2001 | | JP | 2002-333843 | 11/2002 |
| JP | 2001-330840 | 11/2001 | | JP | 2002-341329 | 11/2002 |
| JP | 2001-356353 | 12/2001 | | JP | 2002-341355 | 11/2002 |
| JP | 2001-356354 | 12/2001 | | JP | 2002-341356 | 11/2002 |
| JP | 2002-014360 | 1/2002 | | JP | 2002-341357 | 11/2002 |
| JP | 2002-023176 | 1/2002 | | JP | 2002-341358 | 11/2002 |
| JP | 2002-049045 | 2/2002 | | JP | 2002-341359 | 11/2002 |
| JP | 2002-079160 | 3/2002 | | JP | 2002-341362 | 11/2002 |
| JP | 2002-080321 | 3/2002 | | JP | 2002333721 A * | 11/2002 |
| JP | 2002-082340 | 3/2002 | | JP | 2003241206 A * | 8/2003 |
| JP | 2002-090759 | 3/2002 | | KR | 2000-0035302 | 6/2000 |
| JP | 2002-090760 | 3/2002 | | | | |
| JP | 2002-107740 | 4/2002 | | | | |
| JP | 2002-122870 | 4/2002 | | | | |
| JP | 2002-122872 | 4/2002 | | | | |
| JP | 2002-122873 | 4/2002 | | | | |
| JP | 2002-131762 | 5/2002 | | | | |
| JP | 2002-139734 | 5/2002 | | | | |

OTHER PUBLICATIONS

Machine Translation of JP 2003241206 A; Dec. 11, 2008.*
Machine Translation of JP 2002333721 A; Dec. 11, 2008.*

* cited by examiner

SEALANT HARDENING APPARATUS OF LIQUID CRYSTAL DISPLAY PANEL AND SEALANT HARDENING METHOD THEREOF

This application claims the benefit of the Korean Application Nos. P2003-86435 filed on Dec. 1, 2003, and P2003-97616 filed on Dec. 26, 2003, which are hereby incorporated by reference for all purposes as if fully set forth herein.

BACKGROUND OF THE INVENTION

1. Field of the Invention

The present invention relates to a sealant hardening apparatus of a liquid crystal display panel (LCD panel), and more particularly, to a sealant hardening apparatus, of an LCD panel and a sealant hardening method thereof being easily applied to LCD panels of the different models, which is suitable for decreasing a tact time by irradiating UV rays in a scanning method, or by directly irradiating UV rays to a sealant pattern without using a mask.

2. Discussion of the Related Art

In the related art liquid crystal display (LCD) device, data signals are provided to individual liquid crystal cells arranged in a matrix-type configuration according to video information. Thus, the LCD device displays a desired image by controlling light transmittance of the liquid crystal cells.

The LCD device includes an LCD panel for displaying a picture image and a driving part for applying a driving signal to the LCD panel. The LCD panel includes first and second glass substrates bonded to each other at a predetermined interval, and a liquid crystal layer having an anisotropic dielectric constant being injected between the first and second glass substrates. Accordingly, the desired image is displayed in the LCD device by controlling the light transmittance through the substrate. The light transmittance is controlled by applying an electric field to the liquid crystal having the anisotropic dielectric constant, and varying the strength of that electric field.

The first glass substrate (TFT array substrate) includes a plurality of gate and data lines, a plurality of pixel electrodes, and a plurality of thin film transistors. The plurality of gate lines are formed on the first glass substrate in one direction at fixed intervals, and the plurality of data lines are formed at fixed intervals in a direction perpendicular to the plurality of gate lines. Then, the plurality of pixel electrodes are respectively formed as a matrix-type configuration in pixel regions defined by crossings of the plurality of gate and data lines. The plurality of thin film transistors are switched according to signals of the gate lines triggering the transmitting of signals of the data lines to the respective pixel electrodes.

The second glass substrate (color filter substrate) includes a black matrix layer that excludes light from portions other than the pixel regions of the first substrate; red (R), green (G), and blue (B) color filter layers for displaying various colors, and a common electrode for obtaining the picture image.

Then, the two substrates are bonded to each other by a sealant, maintaining a predetermined space between the two substrates with spacers, and the liquid crystal layer is formed between the two substrates. Accordingly, as turn-on signals are sequentially applied to the gate lines, data signals are applied to the pixel electrode of the corresponding line, thereby displaying the picture image.

A related art LCD panel will be described with reference to the accompanying drawings.

FIG. 1 is an exemplary view of a unit LCD panel having a thin film transistor array substrate and a color filter substrate bonded to each other. Referring to FIG. 1, an LCD panel 10 includes a lower substrate 1 and an upper substrate 2 bonded to each other at a predetermined interval by a sealant 16, and a liquid crystal layer (not illustrated) formed between the lower and upper substrates 1 and 2. Also, the lower substrate 1 includes an active region 13 having liquid crystal cells arranged in a matrix-type configuration, a gate pad part 14 connected with gate lines of the active region 13, and a data pad part 15 connected with the data lines of the active region 13.

The lower substrate 1, which includes a margin region, is larger than the second substrate 2. The gate pad part 14 and the data pad part 15 are formed in the margin region of the lower substrate 1, wherein the margin region of the lower substrate 1 does not overlap with the second substrate 2. In addition, the gate pad part 14 interfaces a scanning signal provided from a gate driver IC with the gate lines of the active region 13, and the data pad part 15 interfaces a video signal provided from a data driver IC with the data lines of the active region 13.

On the lower substrate 1 of the active region 13, the gate line 3 is provided in perpendicular to the data line 4, so as to define a pixel region, wherein the video signal is applied to the data line 4, and the scanning signal is applied to the gate line 3. Then, a pixel electrode (not illustrated) is formed in each pixel region. A thin film transistor is formed at a crossing of the gate and data lines 3 and 4, respectively, wherein the thin film transistor applies the video signal of the data line 4 to the pixel electrode according to the scanning signal of the gate line 3.

On the upper substrate 2 of the active region 13, there are a black matrix layer (not illustrated) that prevents light on portions except the pixel regions, a color filter layer (not illustrated) that realizes various colors corresponding to the respective pixel regions, and a common electrode (not illustrated).

As described above, the lower and upper substrates 1 and 2 are spaced apart from each other by spacer (not illustrated), thereby forming a cell gap between the lower and upper substrates 1 and 2. Then, the lower and upper substrate 1 and 2 are bonded to each other by a sealant 16 in the periphery of the active region 13, and the liquid crystal layer is formed between the lower and upper substrates 1 and 2 to complete the unit LCD panel.

The liquid crystal layer may be formed in a liquid crystal injection method or a liquid crystal dispensing method.

In the liquid crystal injection method, the two substrates bonded by the sealant are maintained in a vacuum state and an inlet formed in the sealant is dipped into a vessel of liquid crystal, whereby the liquid crystal is injected between the two substrates by capillary action. The inlet is sealed after injection of the liquid crystal. However, the liquid crystal injection method has the problem of low yield because a significant period of time is required to inject the liquid crystal between the two substrates. Also, for fabricating a large-sized LCD panel, the liquid crystal may be incompletely injected between the two substrates, causing defects on the LCD panel.

Accordingly, a liquid crystal dispensing method has been researched and developed, in which the appropriate amount of liquid crystal is dispensed on the lower substrate or the upper substrate before bonding the two substrates to each other.

As explained above, in the liquid crystal injection method, the liquid crystal is injected between the lower and upper substrates after bonding the two substrates to each other by the sealant. Meanwhile, in the liquid crystal dispensing method, the liquid crystal is dispensed on any one substrate before bonding the lower and upper substrates to each other, and then when dispensing is complete the two substrates are bonded to each other. Thus, the liquid crystal injection method requires the inlet provided in a sealant pattern thereof, but the liquid crystal dispensing method requires no such inlet.

FIG. 1 shows the LCD panel of the liquid crystal injection method, which has the inlet in the sealant 16.

A method for fabricating the LCD panel of the liquid crystal injection method will be described as follows.

After designing the plurality of LCD panels on the substrate that is larger than one unit LCD panel, the thin film transistor array is formed on the portion corresponding to each LCD panel of the lower substrate 1, and the color filter array is formed on the portion corresponding to each LCD panel of the upper substrate 2.

Subsequently, an alignment layer is formed to align the liquid crystal in the LCD panel of the lower and upper substrates 1 and 2, and the alignment layer is rubbed. Then, the sealant is formed in the periphery of the LCD panel of the lower substrate 1, spacers are scattered on each LCD panel and the opposite lower and upper substrates 1 and 2 are bonded to each other by the sealant.

After that, the sealant is hardened thereby maintaining the cell gap between the bonded two substrates. Then, the bonded substrates are cut into the LCD panels, and the liquid crystal is injected into each LCD panel, whereby the liquid crystal layer is formed between the lower substrate 1 of the thin film transistor array and the upper substrate 2 of the color filter array, and the inlet for injection of the liquid crystal is sealed.

A method for fabricating the LCD panel of the liquid crystal dispensing method will be described as follows.

After designing the plurality of LCD panels on the substrate that is larger than one unit LCD panel, the thin film transistor array is formed on the portion corresponding to each LCD panel of the lower substrate 1, and the color filter array is formed on the portion corresponding to each LCD panel of the upper substrate 2.

Subsequently, a column spacer for maintaining the cell gap and an alignment layer for aligning the liquid crystal are formed in the LCD panel of the lower or upper substrate 1 or 2, and then the alignment layer is rubbed. After that, the sealant is formed in the periphery of the LCD panel of the first substrate 1 to bond the lower and upper substrates to each other, and the appropriate amount of liquid crystal is dispensed on the LCD panel. Then, the lower and upper substrates are bonded to each other by the sealant. Thereafter, the sealant is hardened, thereby maintaining the cell gap between the bonded two substrates, and the bonded substrates are cut into the LCD panels.

As explained above, in order to fabricate the unit LCD panel, it requires the process of forming the thin film transistor array and the color filter array on the different substrates, forming the sealant 16 in the periphery of the active region 13 so as to bond the lower substrate 1 of the thin film transistor array 1 and the upper substrate 2 of the color filter array, and hardening the sealant.

A method of forming the sealant 16 and a method of hardening the sealant 16 will be described in detail.

FIG. 2A and FIG. 2B are exemplary views of a screen-printing method for forming the sealant according to the related art. As illustrated in FIG. 2A and FIG. 2B, the screen-printing method requires a screen mask 6 and a squeegee 8. At this time, the screen mask 6 is patterned to selectively expose portions of a plurality of sealant patterns 16a to 16c. Also, the squeegee 8 forms the plurality of sealant patterns 16a to 16c by selectively providing the sealant 16 to the substrate 1 through the screen mask 6.

The sealant patterns 16a to 16c are provided on the substrate 1 to obtain a gap for the liquid crystal layer, and to prevent the liquid crystal from leaking to the external of the active regions 13a to 13c. Accordingly, the plurality of sealant patterns 16a to 16c are provided in the periphery of the active region 13a to 13c of the substrate 1. In the liquid crystal injection method, the inlets 5a to 5c is provided at one side for injection of liquid crystal. In the liquid crystal dispensing method, the inlet is not required.

The screen-printing method includes the sequential process of coating the sealant 16 on the screen mask 6 having the plurality of sealant patterns 16a to 16c patterned therein, forming the plurality of sealant patterns 16a to 16c on the substrate 1 by printing with the squeegee 8, and leveling by drying solvent of the sealant patterns 16a to 16c.

The screen-printing method is common because of its simpler fabrication process. However, the screen-printing method has disadvantages in that a great amount of sealant 16 is used because the plurality of sealant patterns 16a to 16c are formed using the squeegee 8 to coat the sealant 16 on the entire surface of the screen mask 6.

Also, the screen mask 6 is in contact with the substrate 1, so the alignment layer (not illustrated) of the substrate 1 may have defects, thereby deteriorating the picture quality of the LCD device. In order to overcome the problem of the screen-printing method, a sealant dispensing method has been developed.

FIG. 3 is an exemplary view of the sealant dispensing method for forming the sealant pattern according to the related art. As illustrated in FIG. 3, a table 20 on which the substrate 1 is loaded is movable in all directions. In this state, a predetermined pressure is applied to a plurality of syringes 22a to 22c arranged and fixed by a support 21, thereby dispensing the sealant. As a result, the plurality of sealant patterns 16a to 16c are formed along the periphery of the active region 13a to 13c of the substrate 1.

In the sealant dispensing method, the sealant is selectively provided in the periphery of the active region 13a to 13c of the substrate 1, thereby decreasing the sealant consumption. Also, the plurality of syringes 22a to 22c are not in contact with the active region 13a to 13c of the substrate 1, so that it is possible to prevent the alignment layer (not illustrated) from having the rubbing defect, thereby enhancing the picture quality of the LCD device.

In FIG. 2A, FIG. 2B, and FIG. 3, the sealant is a UV and thermal hardening type sealant.

A method of hardening the sealant according to the related art will be described as follows.

FIG. 4 is an exemplary view of a related art sealant hardening method with UV rays. That is, the lower and upper substrates 1 and 2 bonded by the UV hardening type sealant are loaded on a stage (not illustrated) of a container (not illustrated) for the hardening process. Then, a mask 31 is positioned above the lower and upper substrates 1 and 2 bonded to each other, wherein the mask 31 has an open part 31a corresponding to a portion of the sealant 16 through which light is transmitted, and a closed part 31b corresponding to the remaining portions except the sealant 16 to prevent the light.

By aligning the substrates 1 and 2 and the mask 31, the open part 31a is aligned to correspond with the sealant 16, thereby driving a UV irradiation apparatus 30. As a result, UV rays are irradiated onto the sealant 16 of the bonded substrates 1 and 2 through the open part 31a of the mask 31. The UV irradiation apparatus 30 is fixedly provided. Also, the UV irradiation time may be slightly different according to the size of LCD panel. Generally, the UV rays are irradiated in about 30 seconds.

After completing the UV irradiation process of the bonded substrates, a cell cutting process may be employed. If the sealant used is of a UV and thermal hardening type resin, a thermal hardening process may be employed.

However, the related art method of hardening the sealant with UV rays has a number of disadvantages, such as the following.

First, the sealant is hardened with the mask having an open part and a closed part, so an additional mask is required depending on the model of the LCD panel. Also, because it is necessary to align the mask and the bonded substrates, the fabrication cost increases due to the long tact time required.

Furthermore, by fixedly providing the UV irradiation apparatus, the UV rays are irradiated about 30 seconds so as to harden the sealant. That requires a relatively long tact time, thereby lowering the yield.

SUMMARY OF THE INVENTION

Accordingly, the present invention is directed to a sealant hardening apparatus and a sealant hardening method that substantially obviates one or more problems due to limitations and disadvantages of the related art.

An advantage of the present invention is to provide a sealant hardening apparatus and a sealant hardening method, which is suitable for decreasing a tact time, and for being easily applied to LCD panels of the different models, in a method of irradiating UV rays by a scanning method with a UV irradiator or with movement of a stage, or in a method of directly irradiating UV rays emitted from a lamp house to a sealant pattern through optical fibers without using a mask.

Additional advantages and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these and other advantages and in accordance with the purpose of the invention, as embodied and broadly described herein, a sealant hardening apparatus for an LCD panel includes a stage on which substrates bonded by a sealant are loaded, for being moved in an in-line method; a mask provided above the bonded substrates, having an open part corresponding to a sealant portion to transmit the light, and a closed part corresponding to the remaining portions to prevent the light; at least two align cameras for aligning the mask and the bonded substrates; a lamp for irradiating UV rays of high energy; a plurality of optical fibers for transmitting UV rays of the lamp; and a UV irradiation part for irradiating the UV rays from the optical fibers to the bonded substrates through the mask by arranging and supporting the optical fibers at one line.

In another aspect, a sealant hardening method of an LCD panel by using a sealant hardening apparatus including a stage moved in an in-line method, and a UV irradiation part for irradiating UV rays to bonded substrates, includes steps of positioning the substrates bonded by a sealant on the stage; positioning a mask above the substrates, the mask having an open part corresponding to a sealant portion to transmit the light, and a closed part corresponding to the remaining portions to prevent the light; aligning the bonded substrates and the mask; and hardening the sealant by irradiating the UV rays to the sealant in a scanning method of emitting the UV rays from the UV irradiation part and moving the stage at one direction.

In another aspect, a sealant hardening apparatus includes a stage on which two substrates bonded by a plurality of UV hardening type sealant patterns are loaded, the stage being moved at all directions; a plurality of lamp houses for emitting UV rays; a plurality of UV irradiators for irradiating the UV rays to the sealant patterns; a plurality of optical fibers for transmitting the UV rays emitted from the lamp house to the respective UV irradiators; and a support for supporting the plurality of UV irradiators.

In another aspect, A sealant hardening method of an LCD panel by using a sealant hardening apparatus including a stage moved in vertical and horizontal directions, and a plurality of UV irradiators for irradiating UV rays to bonded substrates, includes steps of positioning and fixing UV irradiators according to the mode of the LCD panel having two substrates bonded by a sealant; positioning the substrates bonded by the sealant on the stage; initializing the stage so as to position each UV irradiator in correspondence with a starting point of the sealant; and vertically and horizontally moving the stage along the sealant at a constant speed while transmitting UV rays irradiated from the UV irradiator to the sealant.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Figure 1:
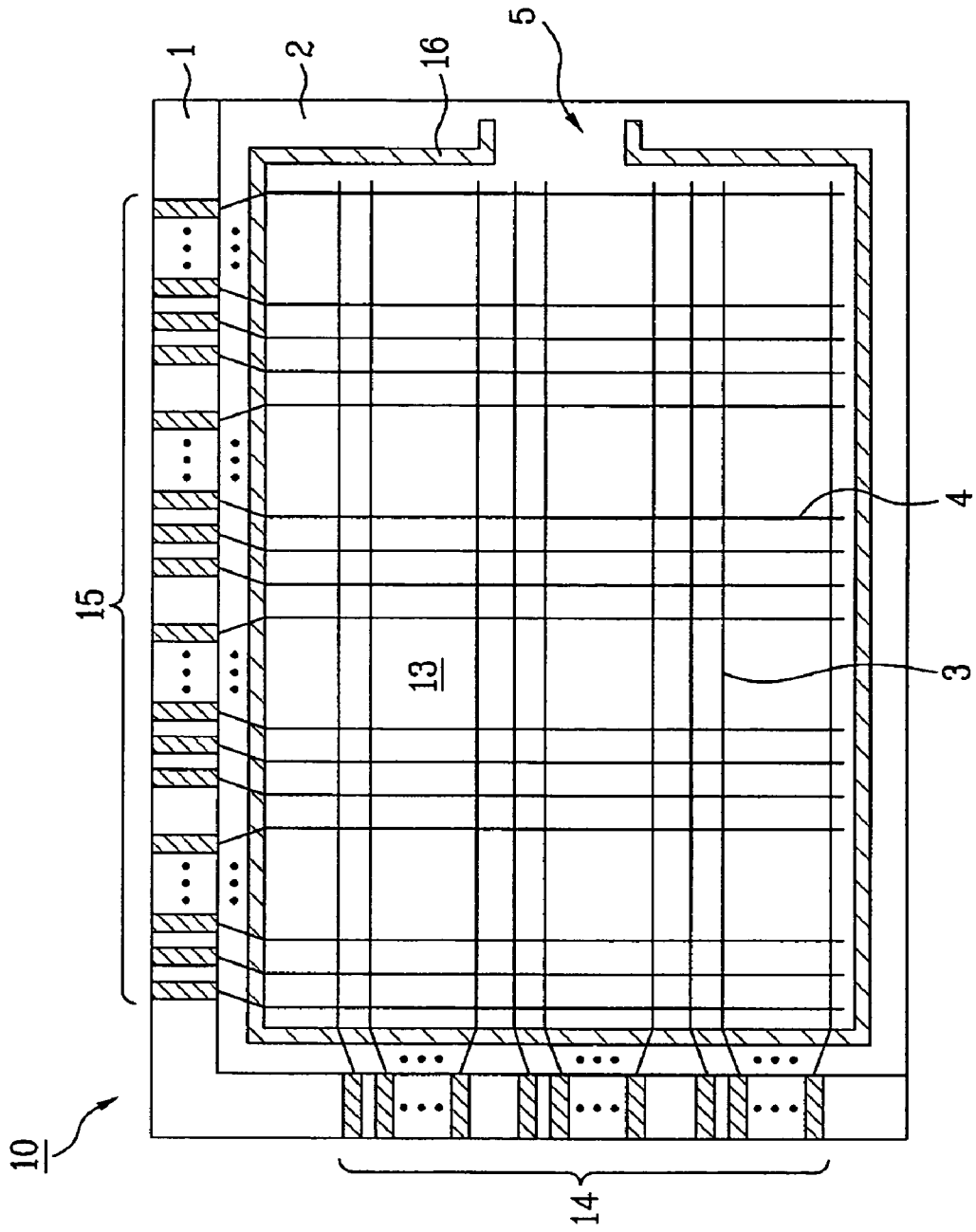
FIG. 1 illustrates a plane view of a unit LCD panel having a thin film transistor array substrate and a color filter substrate bonded to each other in an LCD device according to the related art.
Figure 2A:
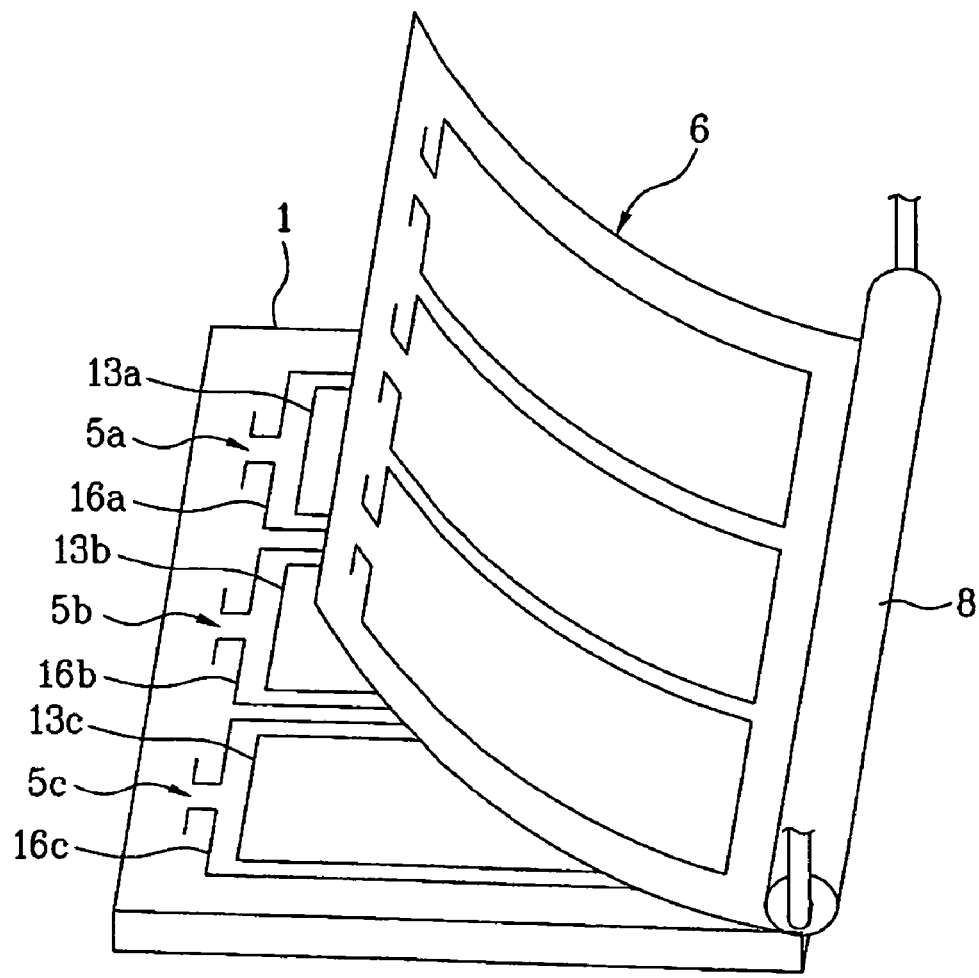
FIG. 2A and FIG. 2B are exemplary views illustrating a screen-printing method for forming a sealant according to the related art.
Figure 2B:
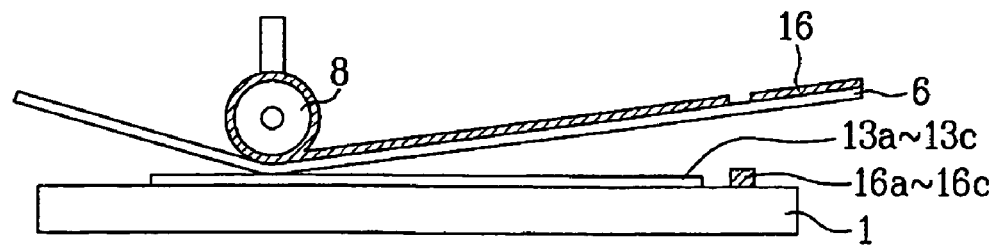
Figure 3:
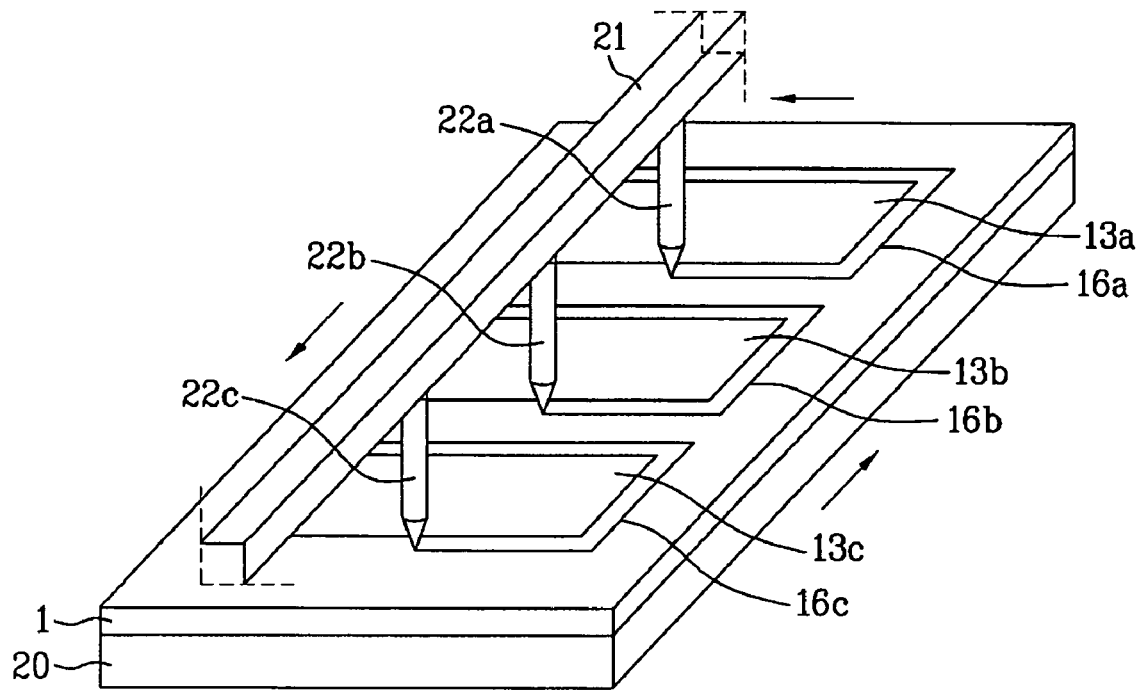
FIG. 3 illustrates an exemplary view of a sealant dispensing method for forming a sealant according to the related art.
Figure 4:
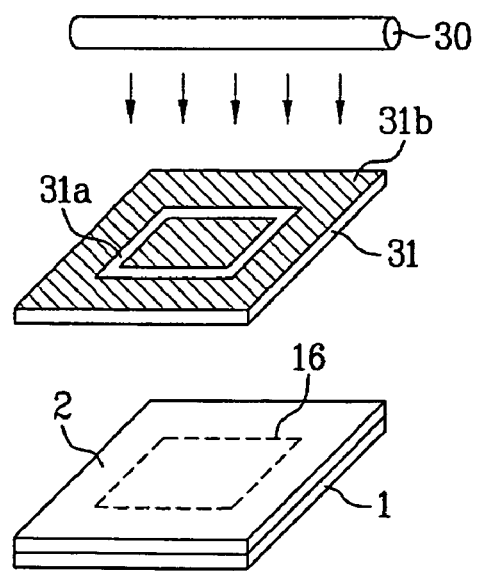
FIG. 4 illustrates an exemplary view of a sealant UV hardening method according to the related art.

Reference will now be made in detail to an embodiment of the present invention, examples of which are illustrated in the accompanying drawings. Wherever possible, the same reference numbers will be used throughout the drawings to refer to the same or like parts.

Hereinafter, a sealant UV hardening apparatus for an LCD panel and a sealant hardening method thereof according to the present invention will be described with reference to the accompanying drawings.

First, an LCD panel according to the present invention may be fabricated in a process similar to that of the related art. A method for fabricating an LCD panel according to the present invention will be described as follows, wherein an LCD panel according to the present invention will be explained with the same reference numbers as those of the related art.

In a method for fabricating an LCD panel according to a liquid crystal injection method, after designing a plurality of LCD panels on a substrate which is larger than a unit LCD panel, a thin film transistor array is formed on a portion corresponding to each LCD panel of a first substrate 1, and a color filter array is formed on a portion corresponding to each LCD panel of an upper substrate 2.

Subsequently, an alignment layer is formed to align liquid crystal in the portion of the LCD panel of the first and second substrates 1 and 2, and the alignment layer is rubbed. Then, a UV and thermal hardening type sealant 16 is formed along the periphery in each LCD panel of the first or second substrate 1 or 2, and spacers are scattered on the portion for each LCD panel of the first or second substrate 1 or 2. After that, the opposite first and second substrates 1 and 2 are bonded to each other.

The sealant is hardened to maintain a cell gap between the bonded two substrates. Then, the bonded substrates are cut into the LCD panels, and the liquid crystal is injected into each LCD panel through an inlet, forming a liquid crystal layer between the first substrate 1 of the thin film transistor array and the second substrate 2 of the color filter array. The inlet for injecting the liquid crystal is sealed.

A method for fabricating the LCD panel according to a liquid crystal dispensing method will be described as follows.

After designing a plurality of LCD panels on a substrate which is larger than a unit LCD panel, a thin film transistor array is formed on a portion corresponding to each LCD panel of a first substrate 1, and a color filter array is formed on a portion corresponding to each LCD panel of a second substrate 2.

Subsequently, a column spacer for maintaining a cell gap and an alignment layer for aligning liquid crystal are formed in the LCD panel of the first or second substrate 1 or 2, and then the alignment layer is rubbed. Thereafter, a UV and thermal hardening type sealant 16 is formed along the periphery in each LCD panel of the first or second substrate 1 or 2, respectively, to bond the first and second substrates to each other, and the appropriate amount of liquid crystal is dispensed on each LCD panel. Then, the opposite first and second substrates 1 and 2 are bonded to each other by the sealant. After that, the sealant is hardened to maintain a cell gap between the bonded two substrates, and the bonded substrates are cut into the LCD panels.

As explained above, in the method of forming the sealant 16 according to the present invention, the UV and thermal hardening type sealant 16 is formed along the periphery in each LCD panel according to a screen-printing method or a sealant dispensing method.

Figure 5:
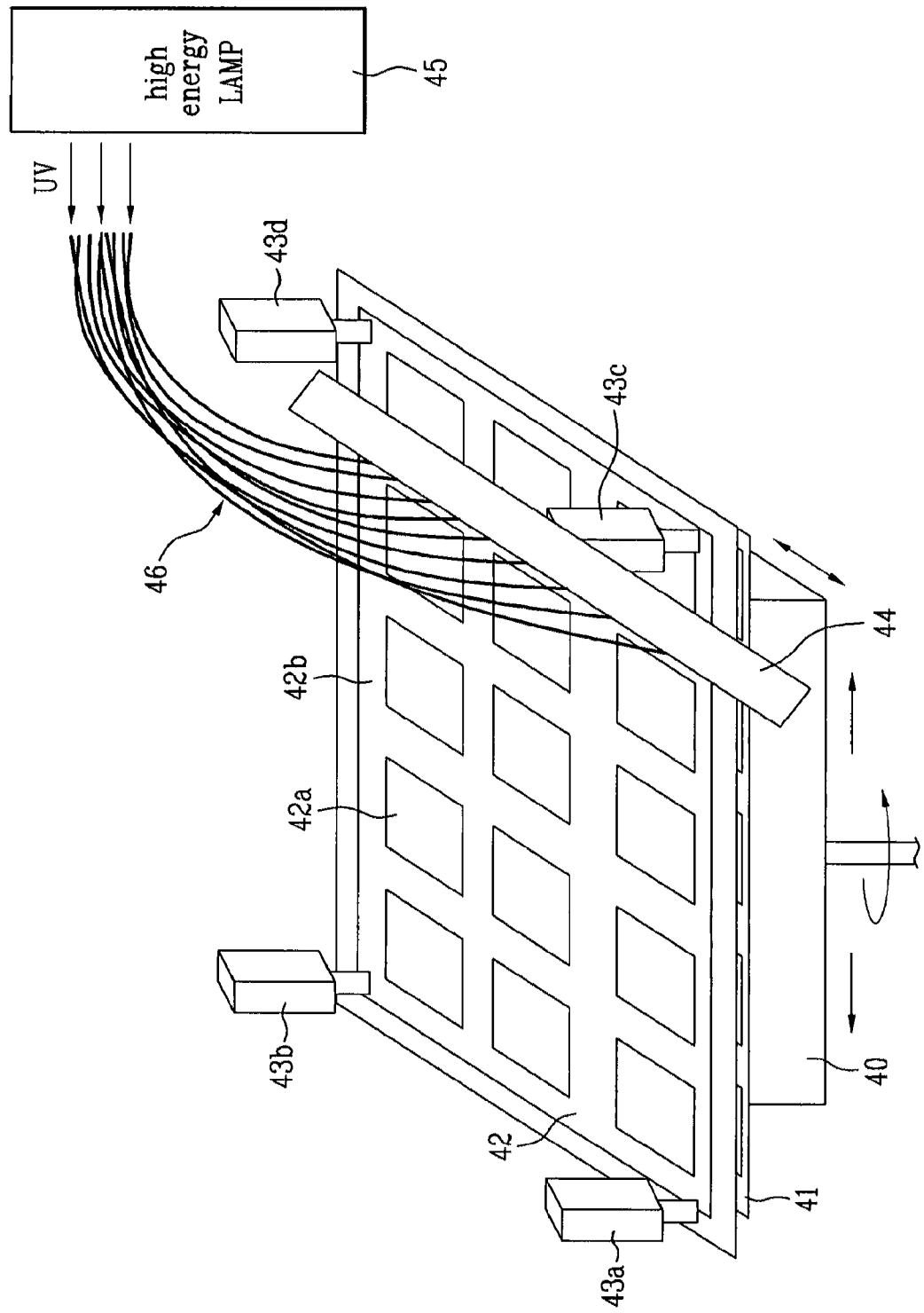
FIG. 5 illustrates a schematic view of a sealant hardening apparatus for an LCD panel according to the first embodiment of the present invention.

FIG. 5 illustrates a schematic view of a sealant hardening apparatus for an LCD panel according to the first embodiment of the present invention. As illustrated in FIG. 5, the sealant hardening apparatus for the LCD panel according to the first embodiment of the present invention is provided with a stage 40, a mask 42, at least two align cameras 43a to 43d, a lamp 45, a plurality of optical fibers 46, and a UV irradiation part 44. At this time, substrates 41, bonded by a sealant, are loaded on a stage 40, and the stage 40 is moved in an in-line method. The mask 42 is positioned above the substrate 41. The mask 42 is provided with an open part 42a corresponding to a portion of the sealant to transmit the light, and a closed part 42b corresponding to the remaining portions except the portion of the sealant. Then, at least two cameras 43a to 43d are provided to align the mask 42 and the substrates 41, and the lamp emits UV rays of high energy. In addition, a plurality of optical fibers 46 are provided to transmit the UV rays emitted from the lamp 45, and the UV irradiation part 44 provides the UV rays to the bonded substrates 41 using the optical fibers 46 arranged and supported in one direction through the mask 42. The stage 40 is moved in one direction by a moving means such as a roller.

The UV irradiation part 44 will be described in detail.

Figure 6:
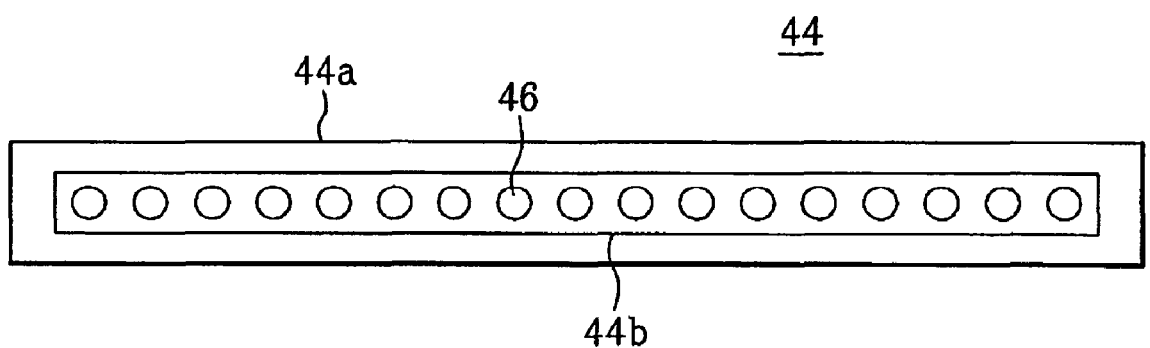
FIG. 6 illustrates a rear view of a UV irradiation part according to the first embodiment of the present invention.

FIG. 6 illustrates a rear view of the UV irradiation part 44 according to the first embodiment of the present invention. The UV irradiation part 44 is provided with a body 44a for arranging and supporting each end of the optical fibers 46 and a condensing lens 44b for condensing the UV rays irradiated from the optical fibers 46. In FIG. 6, one condensing lens 44b is provided to the optical fibers 46. However, it is possible to use one condensing lens for each optical fiber.

A method for hardening the sealant with the sealant hardening apparatus according to the first embodiment of the present invention will be described as follows.

After designing a plurality of LCD panels on a substrate that is larger than a unit LCD panel, a thin film transistor array is formed on a portion corresponding to each LCD panel of a first substrate, and a color filter array is formed on a portion corresponding to each LCD panel of a second substrate.

Subsequently, an alignment layer is formed to align liquid crystals in the portion of the LCD panel of the first and second substrates, and the alignment layer is rubbed after forming. Then, a UV and thermal hardening type sealant is formed in the periphery of the LCD panel of the first or second substrate, and the opposite first and second substrates are bonded to each other.

If the LCD panel is fabricated according to the liquid crystal injection method, spacers are scattered on the portion for each LCD panel of the first or second substrate before bonding the first and second substrates to each other. Then, the opposite first and second substrates are bonded to each other, and the bonded substrates are cut into the LCD panels. After that, liquid crystal is injected into each LCD panel. Meanwhile, in fabricating the LCD panel according to the liquid crystal dispensing method, column spacers are formed on the first or second substrate to maintain a cell gap in the LCD panel of the first or second substrate, and then the appropriate amount of liquid crystal is dispensed on the LCD panel of the first or second substrate. Then, to maintain the cell gap between the bonded substrates, the sealant is hardened, and the bonded substrates are cut into the LCD panels.

A method of hardening the sealant according to the present invention will be described as follows.

First, the substrates 41 bonded by the sealant are loaded on the stage 40 of the sealant hardening apparatus, and the mask 42 is provided above the bonded substrates 41. Then, the bonded substrates 41 and the mask 42 are aligned with the align cameras 43a to 43d.

At this time, the bonded substrates 41 and the mask 42 are firstly aligned with the two align cameras 43a and 43d provided diagonally. If there is any problem with the align mark of the bonded substrates 41 or the mask 42, the bonded substrates 41 and the mask 42 are aligned again with the four align cameras 43*a* to 43*d*.

After completing the alignment of the bonded substrates 41 and the mask 42, UV rays irradiated from the lamp 45 are transmitted to the UV irradiation part 44 through the optical fibers 46, and the stage 40 is moved in one direction. In this method, if the stage 40 is moved to one direction, the sealant is irradiated with the UV rays transmitted from the UV irradiation part 44 in a scanning method. As a result, the sealant is hardened.

At this time, the bonded substrates may have different positions on the stage 40 according to the mode of the LCD device. For example, in an IPS mode LCD device, the color filter array substrate is provided toward the UV irradiation part 44. In a TN mode LCD device, the thin film transistor array substrate is provided toward the UV irradiation part 44.

A sealant hardening apparatus of an LCD panel and a sealant hardening method according to the second embodiment of the present invention will be described as follows.

Figure 7:
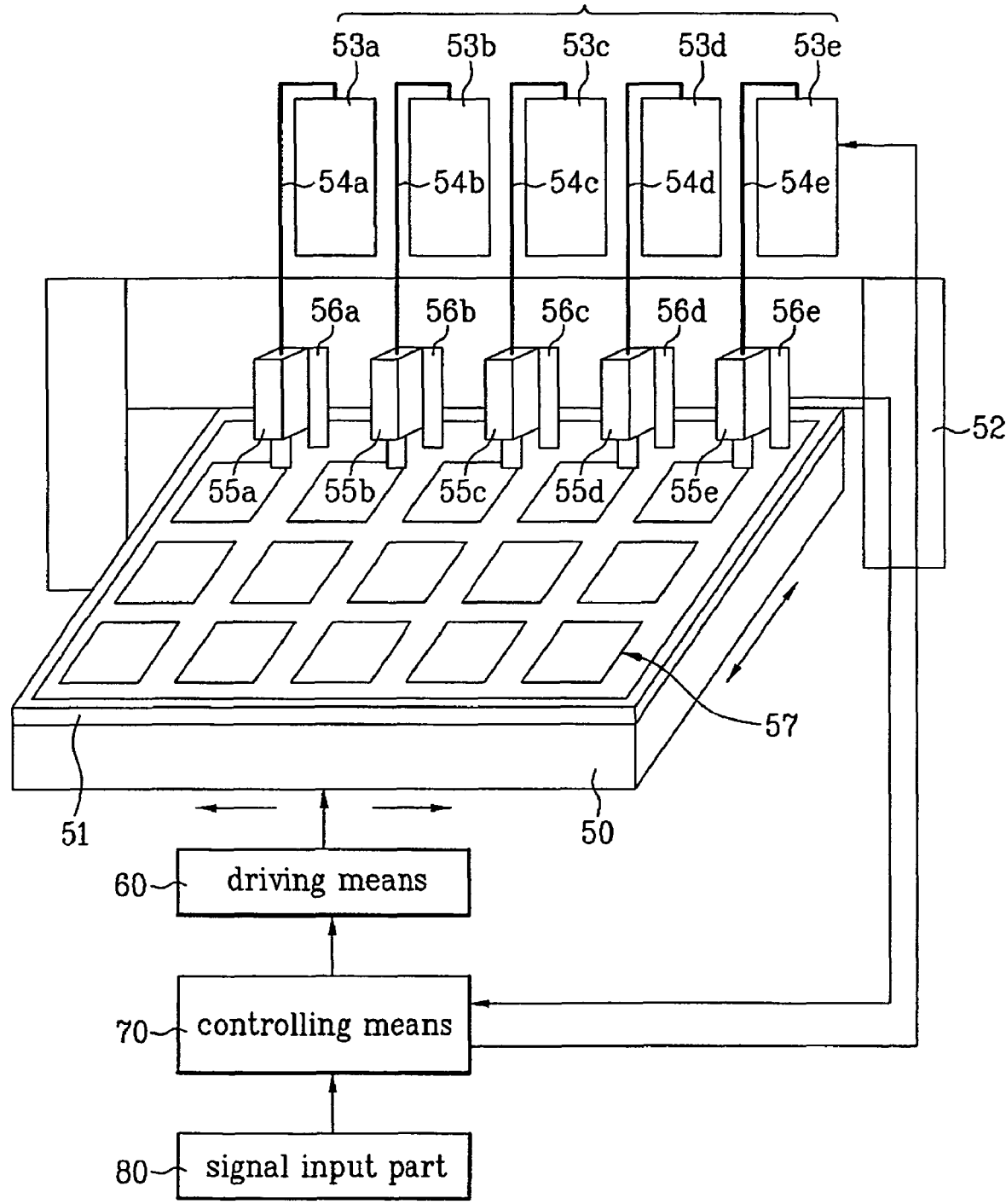
FIG. 7 illustrates a schematic view of a sealant hardening apparatus for an LCD panel according to the second embodiment of the present invention.

FIG. 7 is a schematic view of a sealant hardening apparatus of an LCD panel according to the second embodiment of the present invention. As illustrated in FIG. 7, a sealant hardening apparatus of an LCD panel according to the second embodiment of the present invention is provided with a stage 50, a plurality of lamp houses 53*a* to 53*e*, a plurality of UV irradiators 55*a* to 55*e*, a plurality of optical fibers 54a to 54*e*, a plurality of laser gap sensors 56*a* to 56*e*, and a support 52. Two substrates bonded by a plurality of UV hardening type seal patterns 57 are loaded on the stage 50, wherein the stage 50 is movable in all directions. The plurality of lamp houses 53*a* to 53*e* are provided to irradiate UV rays, and the plurality of UV irradiators 55*a* to 55*e* are provided in correspondence with the seal patterns 57 of at least one line among the plurality of UV hardening type seal patterns 57. Then, the plurality of optical fibers 54*a* to 54*e* are provided to transmit the UV rays emitted from the lamp houses 53*a* to 53*e* to the respective UV irradiators 55*a* to 55*e*. The plurality of laser gap sensors 56*a* to 56*e* are provided in the respective UV irradiators 55*a* to 55*e*, so as to sense the interval between the bonded substrates 51 and the respective UV irradiators 55*a* to 55*e*. Also, the support 52 is provided to support the plurality of UV irradiators 55*a* to 55*e* and the plurality of laser gap sensors 56*a* to 56*e*.

Although not illustrated, the plurality of UV irradiators 55*a* to 55*e* and the plurality of laser gap sensors 56*a* to 56*e* may be fixed by using the additional fixation means so that the number and position of the plurality of UV irradiators 55*a* to 55*e* and the laser gap sensors 56*a* to 56*e* fixed to the support 52 may be varied based on the model of the LCD panel.

Also, the laser gap sensors 56*a* to 56*e* are provided not in the UV irradiators but in the lower side of the support, whereby it is possible to control the support for being at the predetermined interval from the bonded substrates, and being in parallel with the bonded substrates by the gap sensors.

In FIG. 7, it is illustrated as the plurality of lamp houses 53*a* to 53*e* are provided. However, one lamp house may be provided, and UV rays emitted from one lamp house may be transmitted to the respective UV irradiators 53*a* to 53*e* through the optical fibers 54*a* to 54*e*. Furthermore, the support 52 is controlled to have the different heights dependent to the thickness of the bonded substrates.

The stage 50 is moved in vertical and horizontal to the driving means 60, and the driving means 60 is controlled by the controlling means 70 for controlling the distance of the stage moved vertically or horizontally dependent to the model of LCD panel. Also, the controlling means 70 is provided with a signal input part 80, through which a worker can input data relating the model of the LCD panel loaded on the stage 50. The controlling means 70 can control the UV irradiation by controlling the respective lamp houses 53*a* to 53*e*.

A sealant hardening method of the LCD panel according to the second embodiment of the present invention will be described as follows.

First, the position of the UV irradiators 55*a* to 55*e* fixed to the support 52 is controlled based on the model of the substrates 51 bonded by the sealant, and the respective UV irradiators 55*a* to 55*e* are fixed to the support 52. At this time, the respective UV irradiators 53*a* to 53*e* are provided at the predetermined interval from the bonded substrates 51 under control of the gap laser sensors 56*a* to 56*e*.

After that, the bonded substrates 51 are loaded on the stage 50. Then, the data dependent on the model of the bonded substrates 51 is input through the signal input part 80, and inputs operation instructions. Accordingly, the controlling means 70 initializes the stage 50 so that each UV irradiator is positioned in correspondence with a starting point of the sealant pattern 57. Also, the controlling means 70 drives the respective lamp houses 53*a* to 53*e* to irradiate the UV rays.

By controlling the driving means 60, the stage 50 is vertically or horizontally moved along the sealant pattern 57 at a constant speed. As a result, the UV irradiators 53*a* to 53*e* provides the UV rays along the sealant pattern 57, thereby hardening the sealant.

The sealant hardening apparatus of the LCD panel and the sealant hardening method according to the second embodiment of the present invention are more effective in regularly arranging the LCD panels of the same model on one substrate.

At this time, the bonded substrates may have the different positions on the stage 50 according to the mode of the LCD device. For example, in an IPS mode LCD device, the color filter array substrate is provided toward the UV irradiator. In a TN mode LCD device, the thin film transistor array substrate is provided toward the UV irradiator.

As mentioned above, the sealant hardening apparatus of the LCD panel according to the present invention has the following advantages.

In the related art, the bonded substrates and the mask are positioned in the container for irradiating the UV rays, and then the UV rays are irradiated to the sealant in the fixed state for a long time, thereby increasing the tact time. However, in the sealant hardening apparatus according to the first embodiment of the present invention, the UV rays are irradiated to the sealant in the scanning method, so that it is possible to decrease the tact time, and to enhance the yield.

Furthermore, in the sealant hardening apparatus according to the second embodiment of the present invention, the sealant is hardened without using the additional mask, thereby decreasing the fabrication cost. In addition, it is not necessary to complicate the process of aligning the mask and the bonded substrates, so it is possible to decrease the tact time, and to enhance the yield.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A sealant hardening apparatus for an LCD panel comprising:
    a stage on which substrates bonded by a plurality of sealant lines are loaded, for being moved in an in-line method;

a mask provided above the bonded substrates, having a plurality of open lines corresponding to only the plurality of sealant lines to transmit the light, and a closed part corresponding to the remaining portions to prevent the light, wherein each of the plurality of sealant lines is formed of a closed loop and each of the plurality of open lines is formed of a closed loop corresponding to the each sealant line;

four aligning cameras above four corners of the mask for aligning the mask and the bonded substrates, wherein two aligning cameras, provided diagonally in the four aligning cameras, firstly align the mask and the bond substrates and then, if the mask and the bonded substrates are misaligned, the four aligning cameras realign the mask and the bonded substrates;

a lamp irradiating ultra-violet (UV) rays of high energy;

a plurality of optical fibers transmitting UV rays of the lamp; and a UV irradiation part arranging and supporting the plurality of optical fibers in a single liner arrangement and irradiating the UV rays from the plurality of optical fibers to the bonded substrates through the mask so as to harden the plurality of sealant lines, wherein the UV irradiation part includes:
   a body supporting ends of the plurality of optical fibers being arranged in the single liner arrangement; and
   a single condensing lens provided to the plurality of optical fibers and condensing the UV rays from the plurality of optical fibers, being arranged in the single liner arrangement, into the plurality of sealant lines through the mask so as to harden the plurality of sealant lines, wherein the condensing lens is positioned over the mask so a length direction of the condensing lens is parallel with a short-side direction of the mask.

2. The sealant hardening apparatus of claim 1, wherein the stage is moved in one direction by a moving means.

* * * * *